United States Patent
Kim et al.

(10) Patent No.: US 11,714,484 B2
(45) Date of Patent: Aug. 1, 2023

(54) METHOD AND SYSTEM FOR INTERACTION BETWEEN VR APPLICATION AND CONTROLLER CAPABLE OF CHANGING LENGTH AND CENTER OF GRAVITY

(71) Applicant: KOREA UNIVERSITY OF TECHNOLOGY AND EDUCATION INDUSTRY-UNIVERSITY COOPERATION FOUNDATION, Cheonan-si (KR)

(72) Inventors: Tae Hoon Kim, Cheonan-si (KR); Seong Won Jeong, Cheonan-si (KR); Hyun U Ko, Cheonan-si (KR); Seong Ho Kim, Jincheon-gun (KR); Sang Youn Kim, Seoul (KR)

(73) Assignee: KOREA UNIVERSITY OF TECHNOLOGY AND EDUCATION INDUSTRY-UNIVERSITY COOPERATION FOUNDATION, Cheonan-si (KR)

(*) Notice: Subject to any disclaimer, the term of this patent is extended or adjusted under 35 U.S.C. 154(b) by 0 days.

(21) Appl. No.: 17/533,405

(22) Filed: Nov. 23, 2021

(65) Prior Publication Data
US 2023/0041922 A1 Feb. 9, 2023

(30) Foreign Application Priority Data
Aug. 3, 2021 (KR) .......... 10-2021-0101837

(51) Int. Cl.
*G06F 3/01* (2006.01)
*H02N 2/02* (2006.01)
*G06T 11/00* (2006.01)

(52) U.S. Cl.
CPC .............. *G06F 3/011* (2013.01); *G06F 3/016* (2013.01); *G06T 11/00* (2013.01); *H02N 2/023* (2013.01)

(58) Field of Classification Search
None
See application file for complete search history.

(56) References Cited

U.S. PATENT DOCUMENTS

| 8,542,105 | B2 | 9/2013 | Grant et al. | |
|---|---|---|---|---|
| 10,852,093 | B2 | 12/2020 | Monti | |
| 2014/0320400 | A1* | 10/2014 | Jiang | G06F 3/017 345/156 |

FOREIGN PATENT DOCUMENTS

| KR | 10-2009-0054362 A | 5/2009 |
|---|---|---|
| KR | 10-2010-0063795 A | 6/2010 |
| KR | 10-2248934 B1 | 5/2021 |

OTHER PUBLICATIONS

Office Action dated Jul. 11, 2022 in Korean Application No. 10-2021-0101837.

* cited by examiner

*Primary Examiner* — Ifedayo B Iluyomade
(74) *Attorney, Agent, or Firm* — Sughrue Mion, PLLC

(57) ABSTRACT

Disclosed is an interaction system between a controller and a VR application. The interaction system includes a controller including a first actuator configured to move a mass and a first processor configured to control an operation of the first actuator; and a content execution device configured to execute an application according to a control signal received from the controller and generate a feedback signal to transmit the generated feedback signal to a controller when a virtual object change event occurs during the application execution, wherein the first processor of the controller controls the first actuator when the feedback signal is (Continued)

received to move the mass and move a center of gravity. According to the present disclosure, since the center of gravity and the length of the controller operated by the user in reality may be changed in linkage with a change of the virtual object displayed on the display while executing the VR application, it is possible to greatly improve the immersion and feeling of use of the user.

5 Claims, 17 Drawing Sheets

[FIG. 1]
(Prior Art)
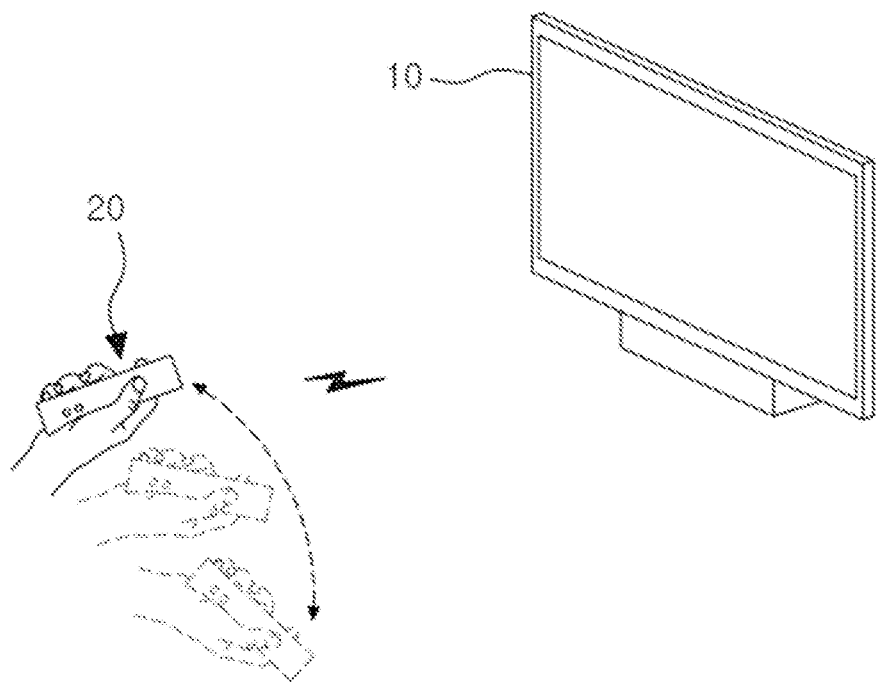
[FIG. 2]
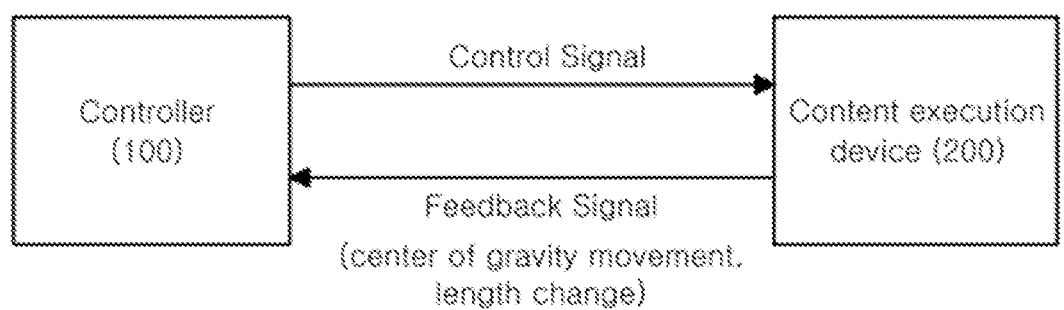

[FIG. 3]
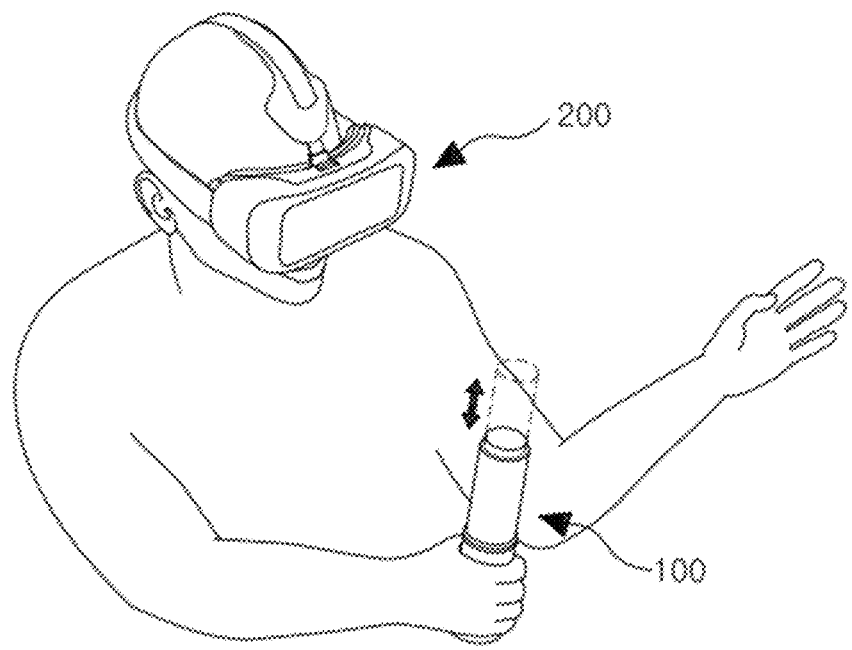
[FIG. 4]
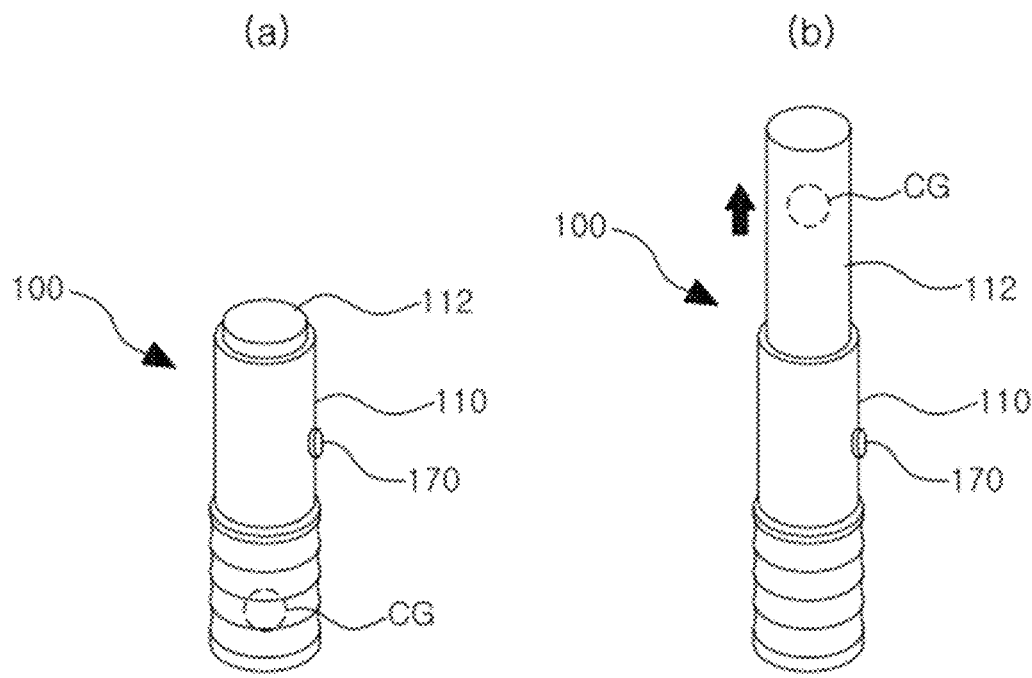

[FIG. 5]
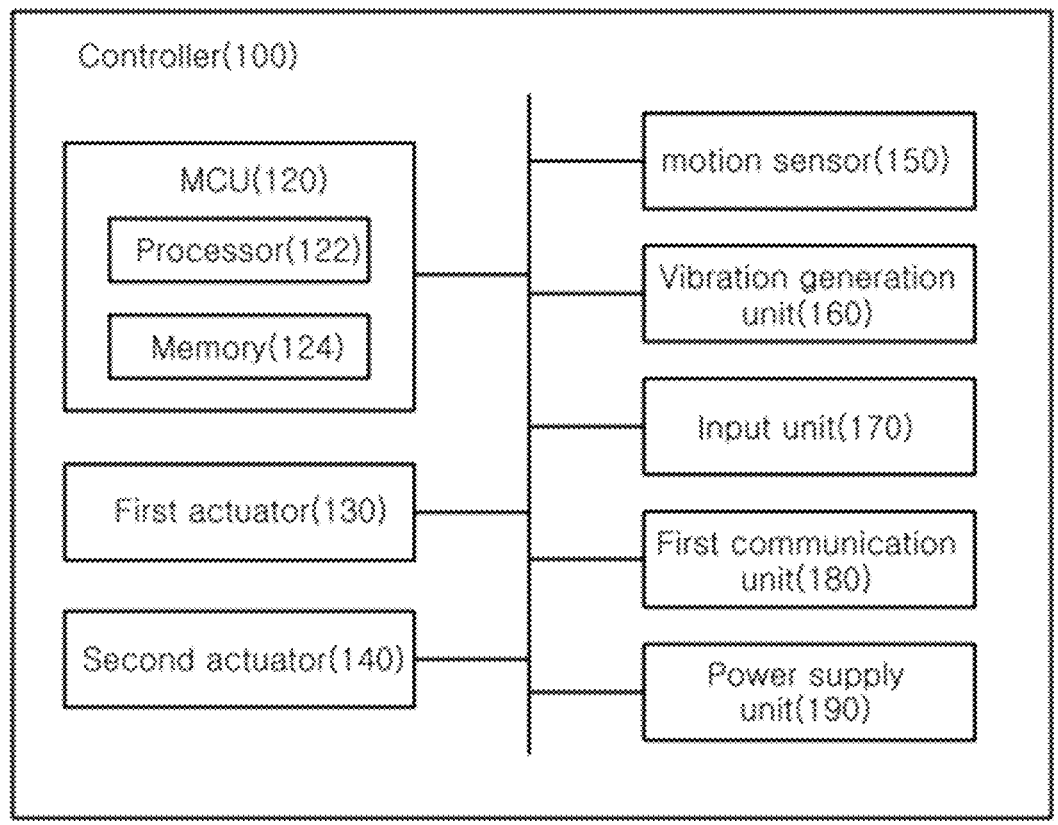
[FIG. 6]
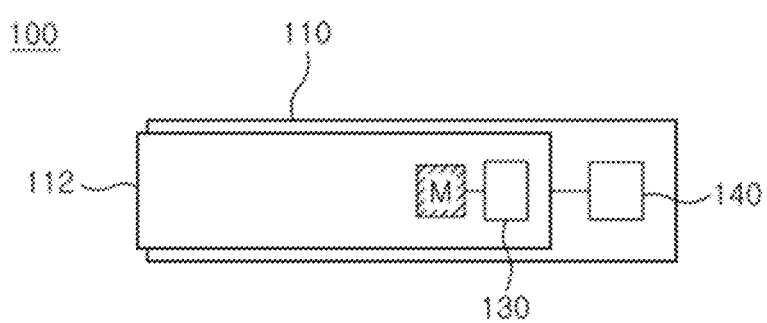

[FIG. 7]
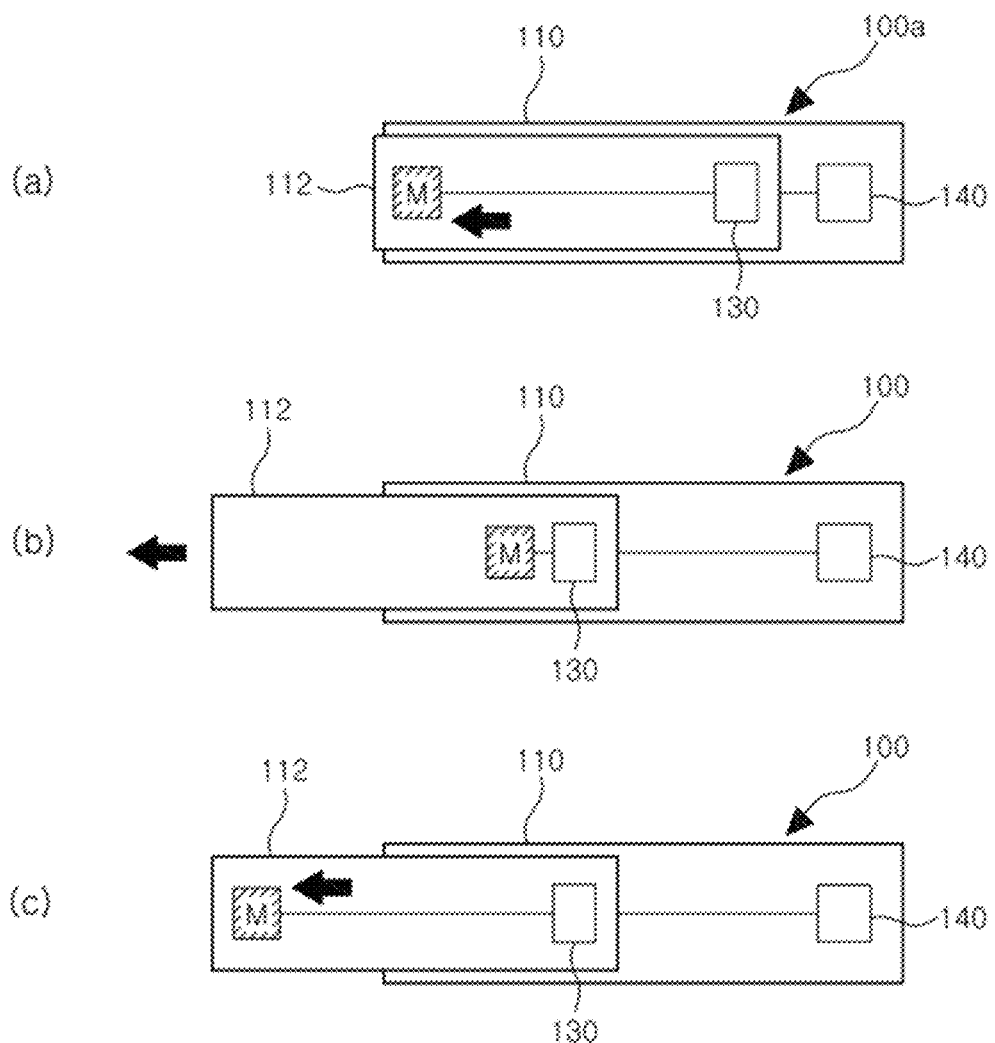

[FIG. 8]
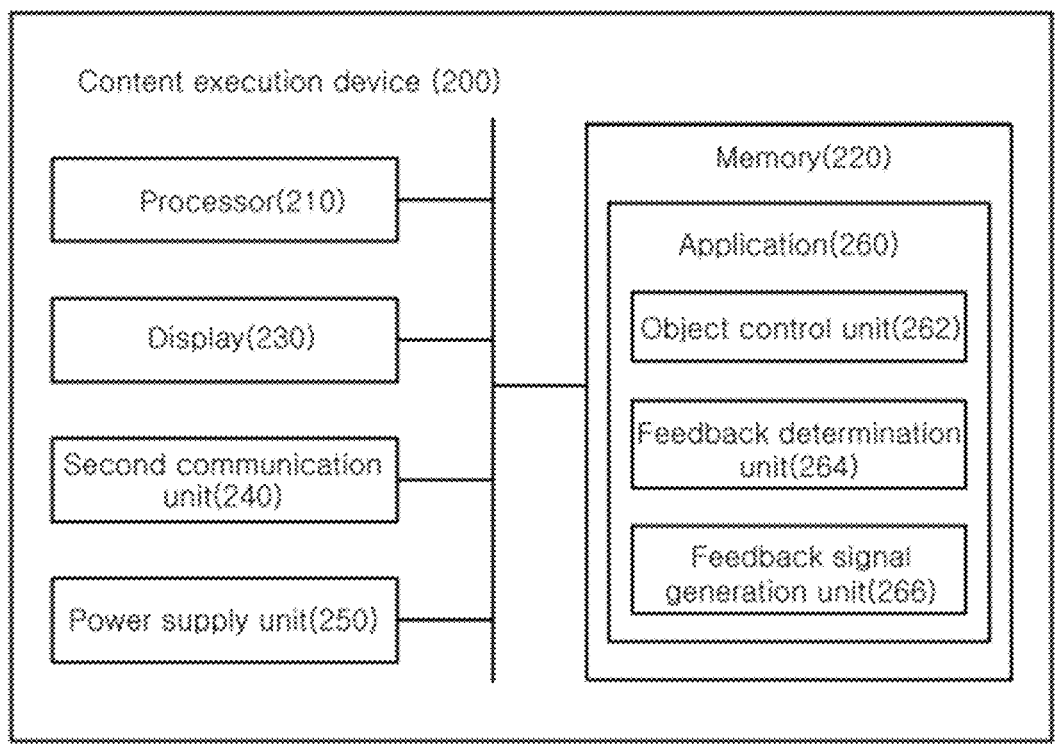

[FIG. 9]
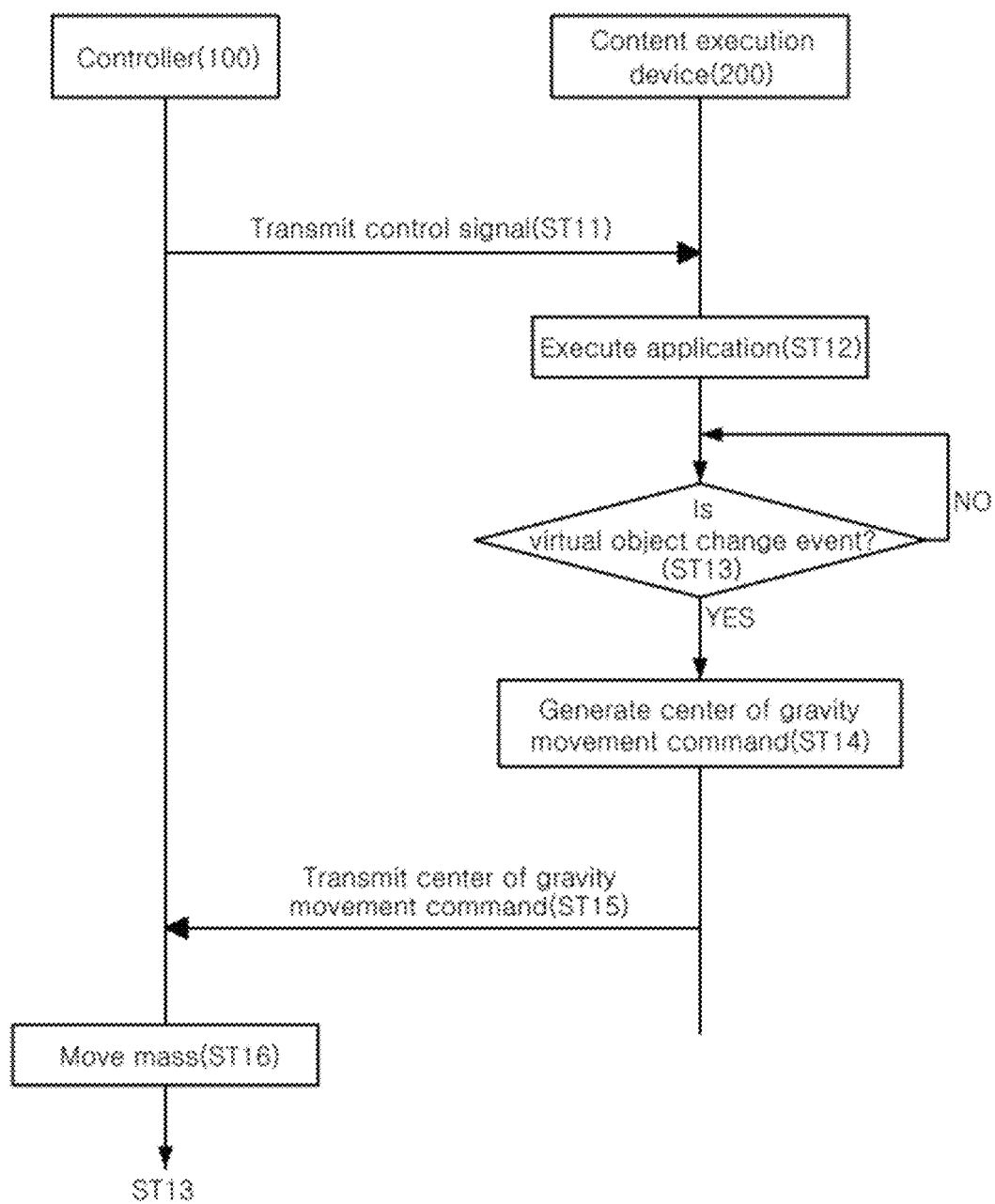

[FIG. 10]
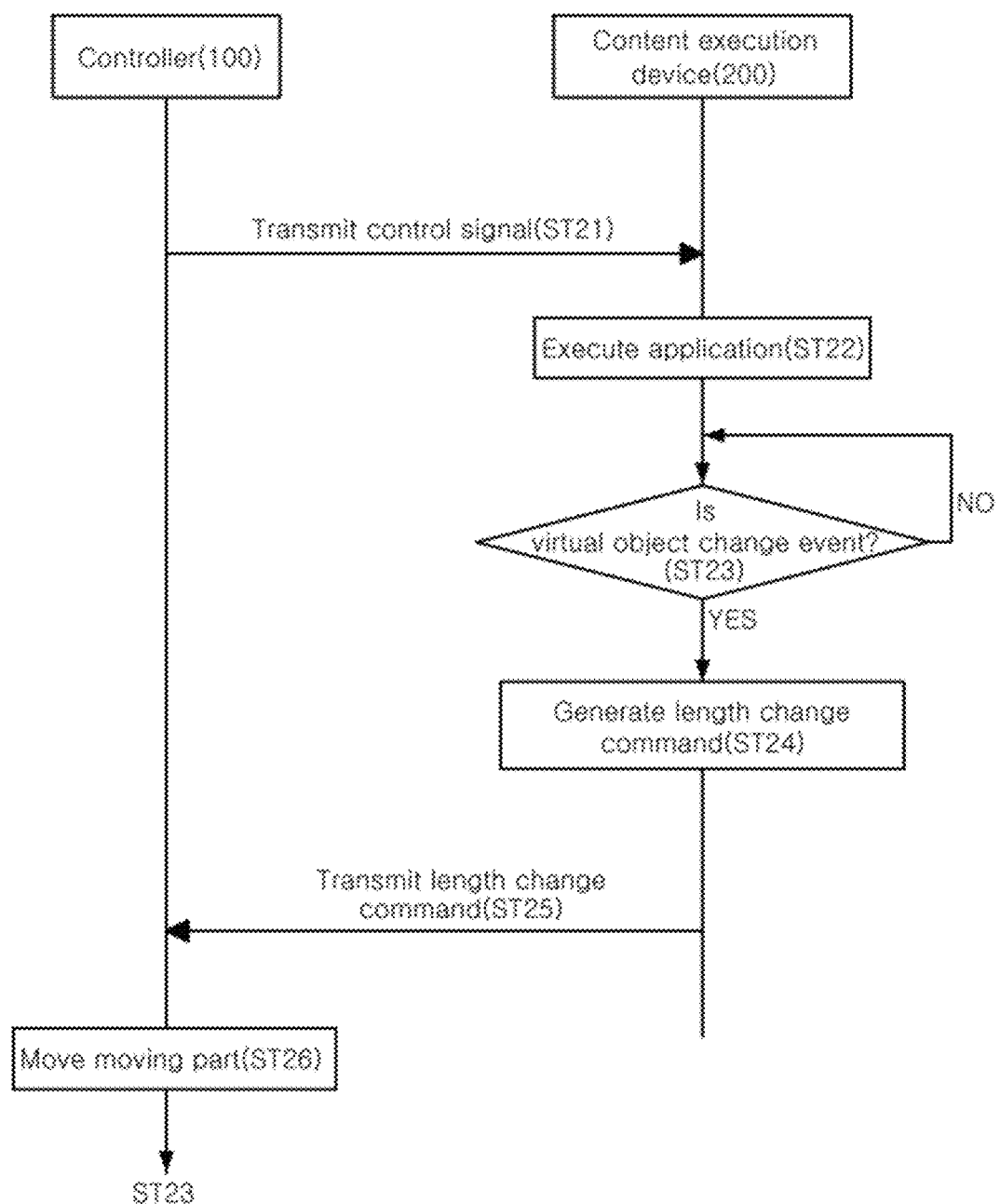

[FIG. 11]
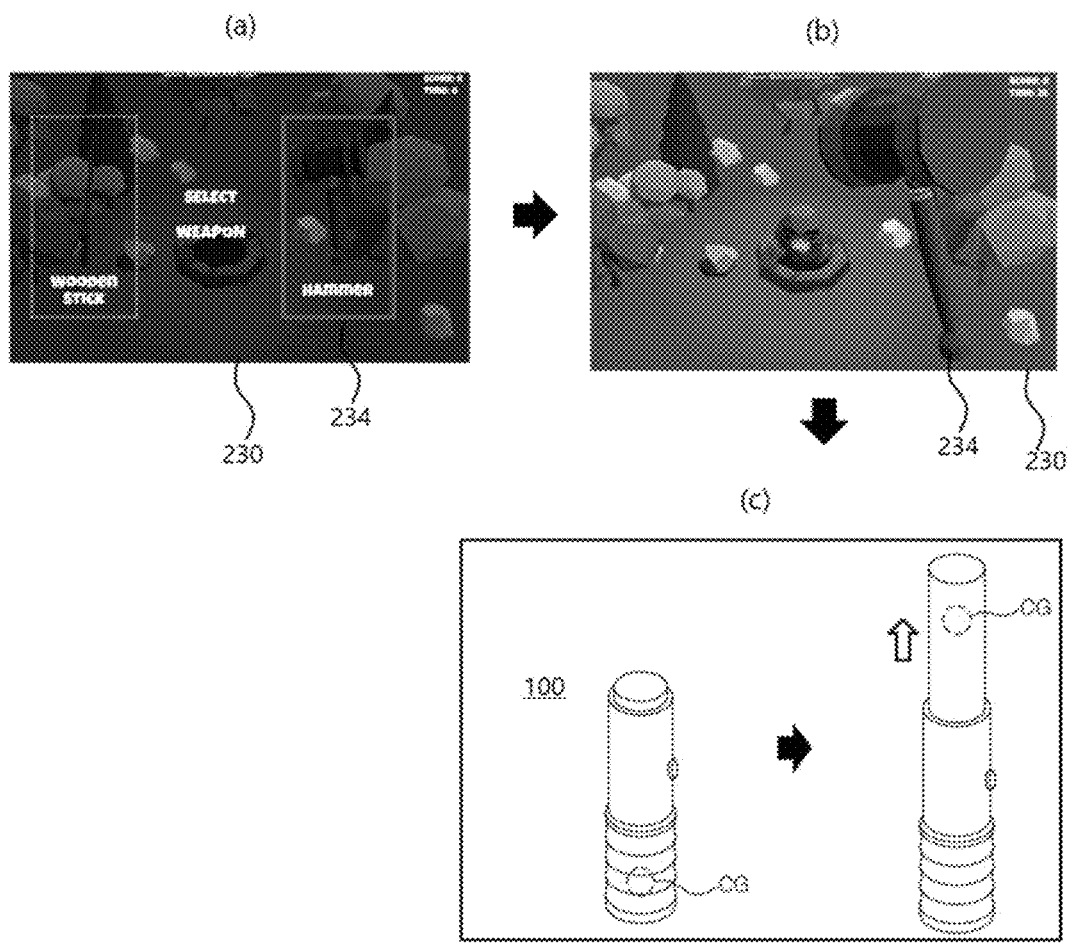

[FIG. 12]
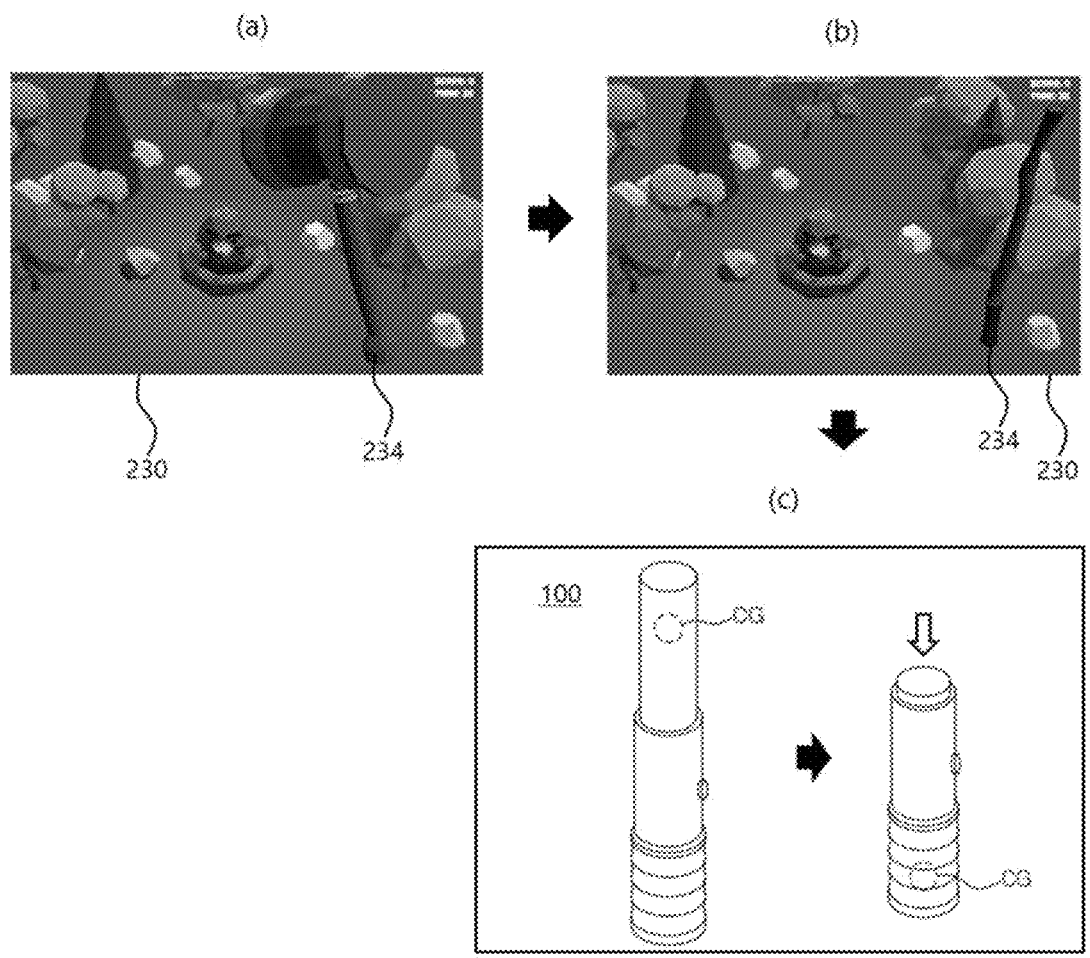

[FIG. 13]
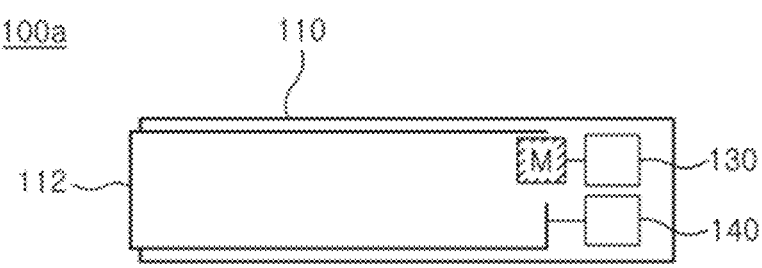

[FIG. 14]
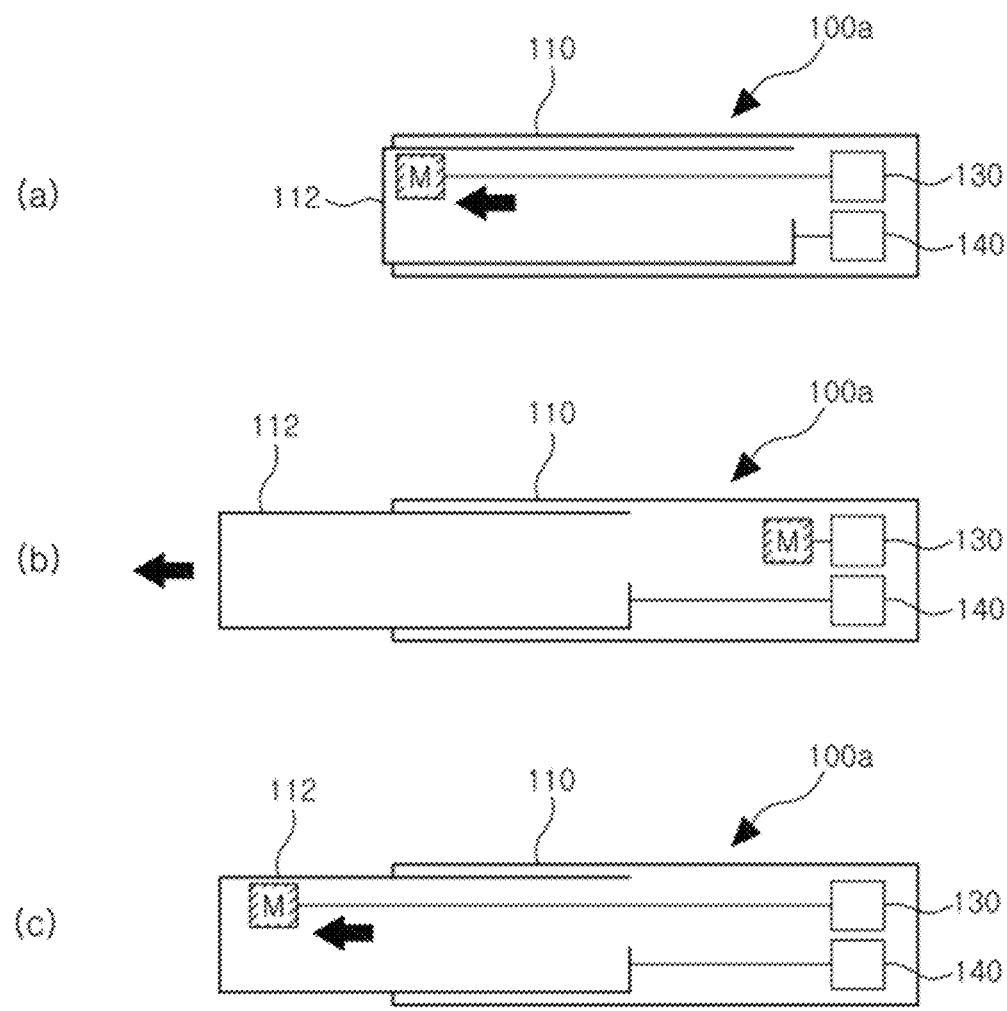
[FIG. 15]
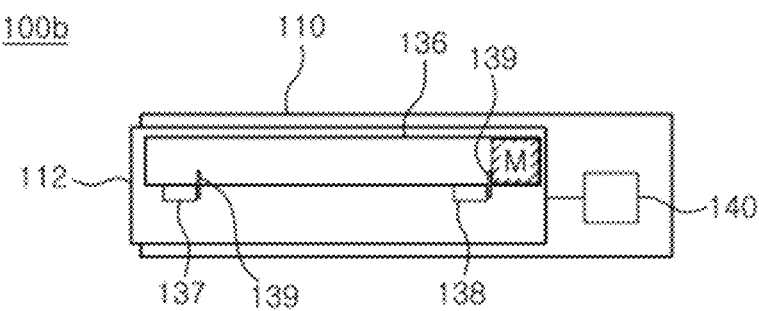

[FIG. 16]
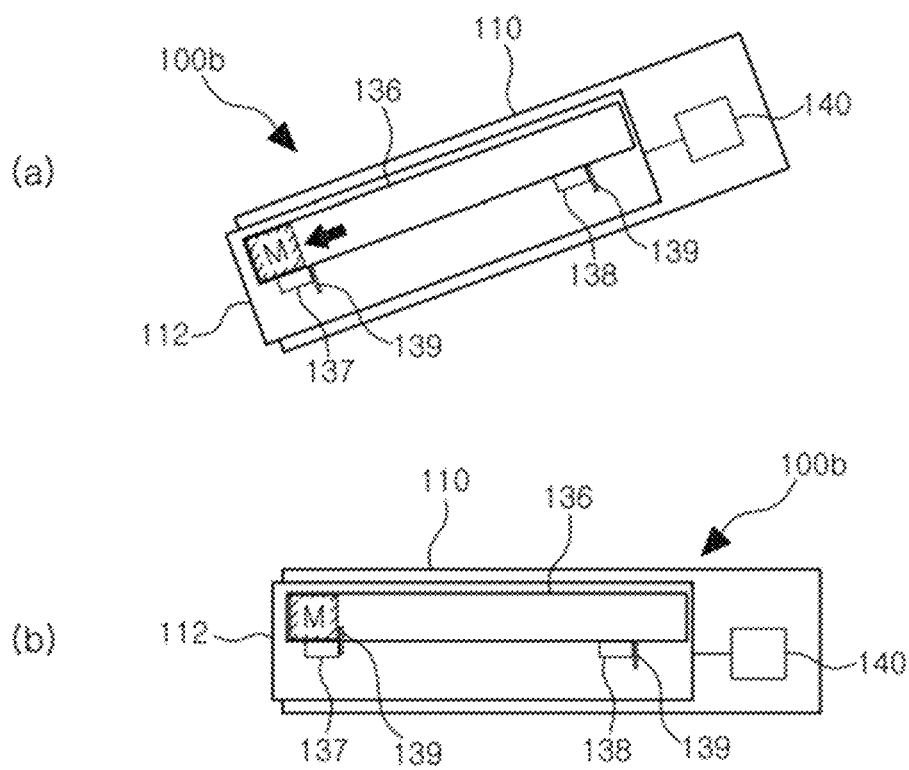

[FIG. 17]
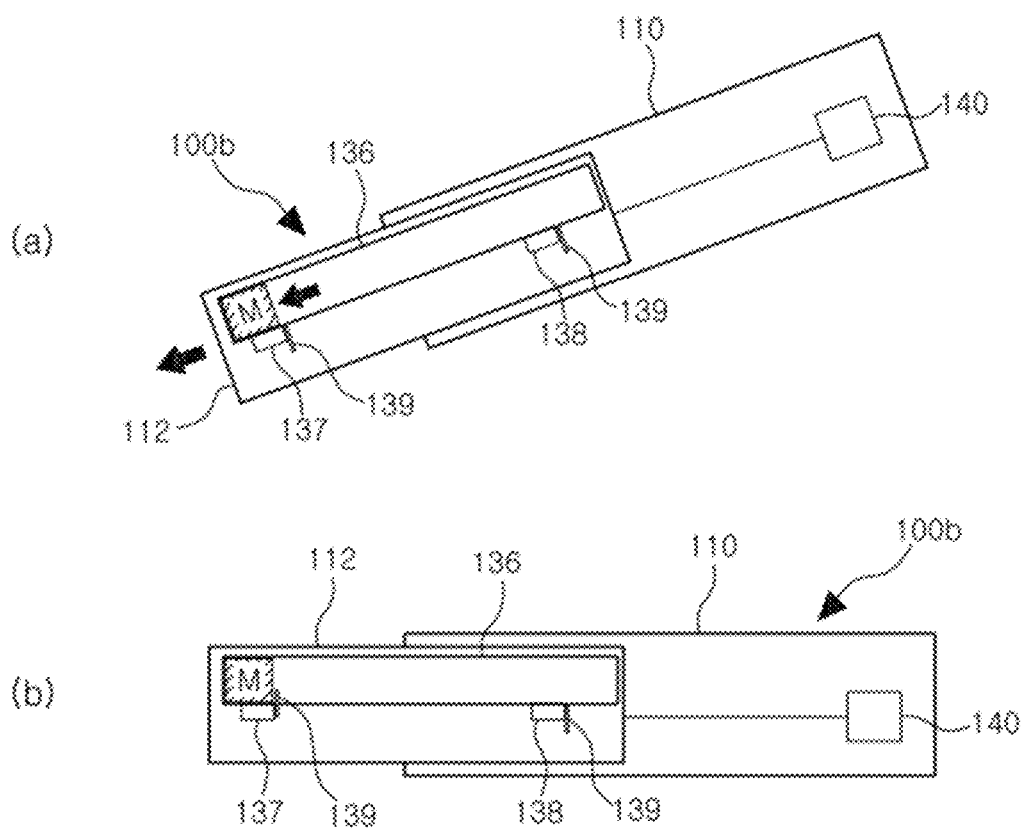
[FIG. 18]
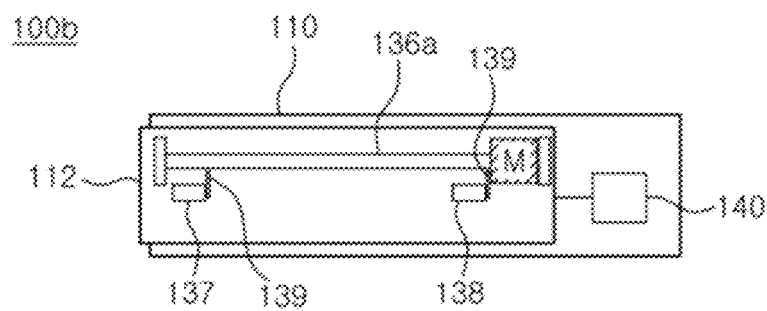

[FIG. 19]
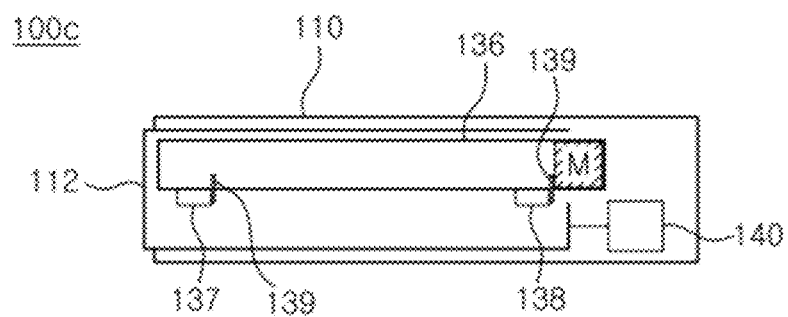
[FIG. 20]
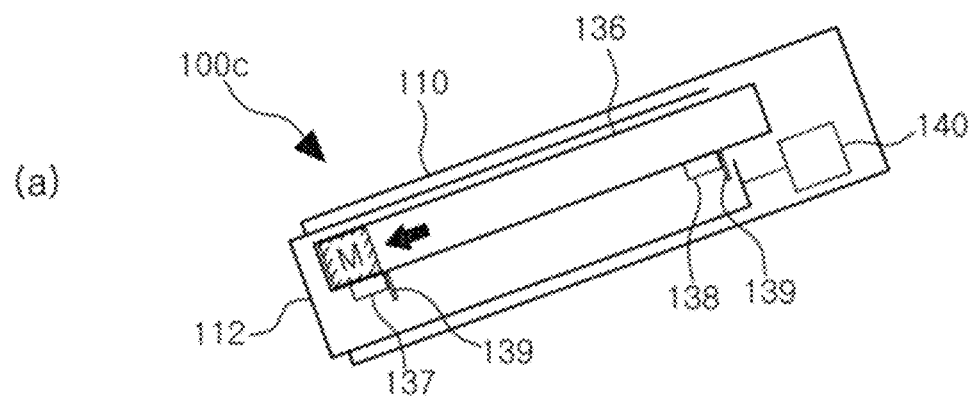
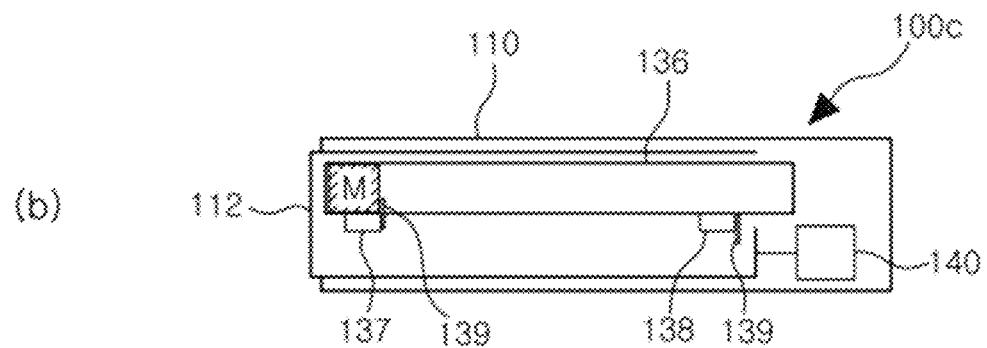

[FIG. 21]
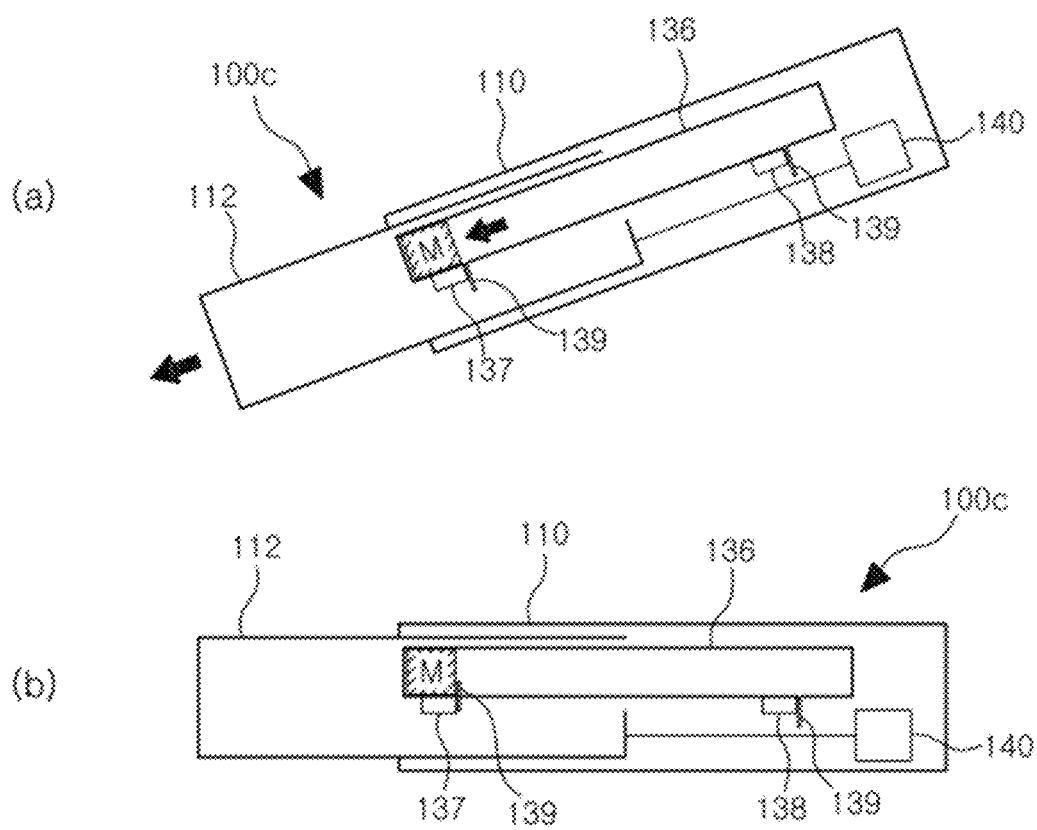
[FIG. 22]
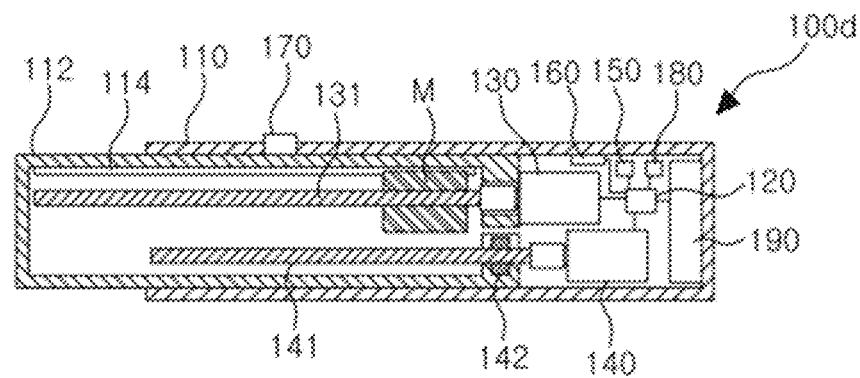

[FIG. 23]
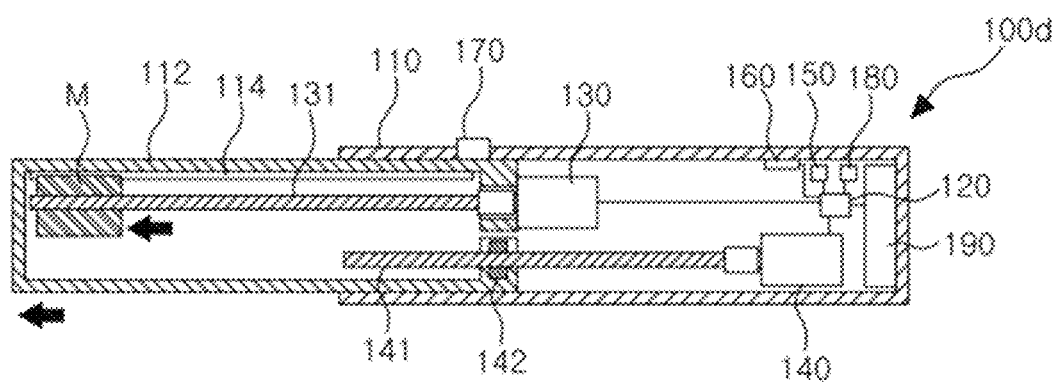
[FIG. 24]
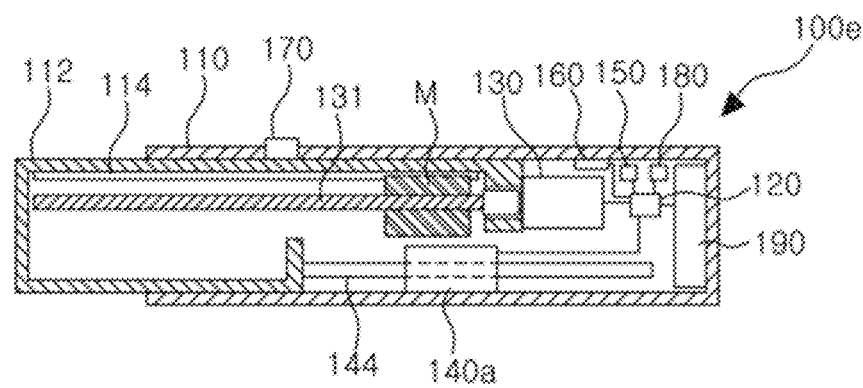
[FIG. 25]
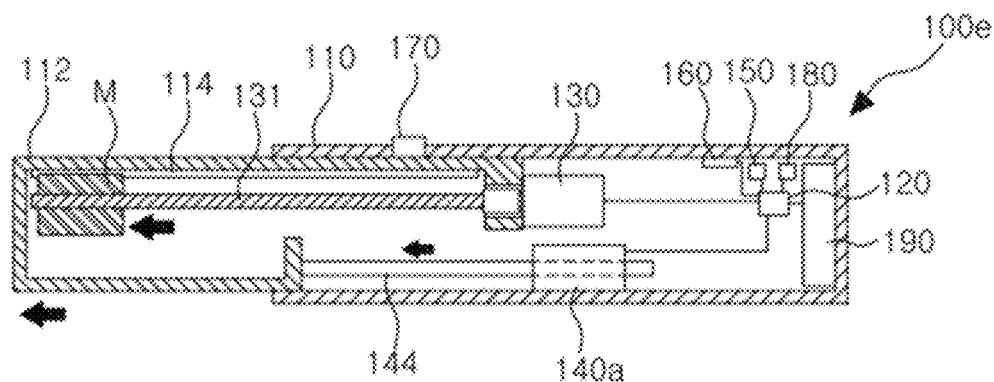

[FIG. 26]
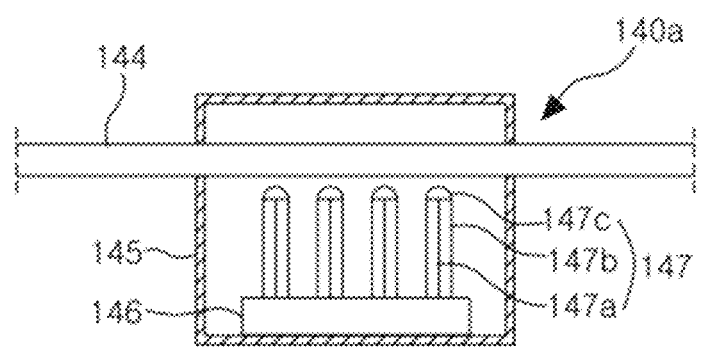
[FIG. 27]
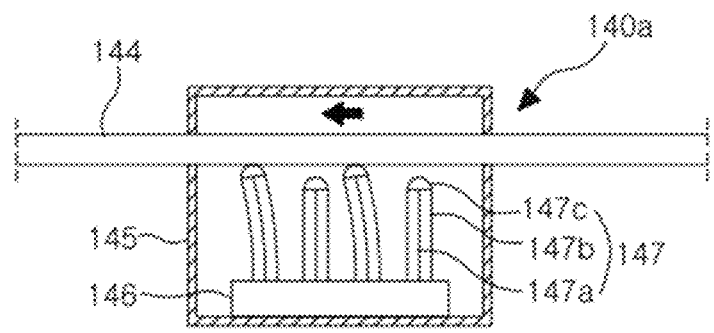
[FIG. 28]
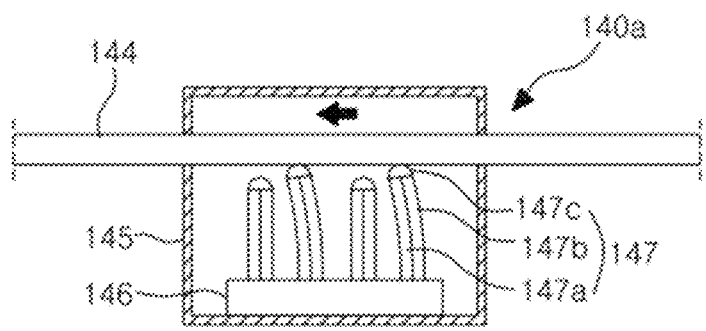

METHOD AND SYSTEM FOR INTERACTION BETWEEN VR APPLICATION AND CONTROLLER CAPABLE OF CHANGING LENGTH AND CENTER OF GRAVITY

CROSS-REFERENCE TO RELATED APPLICATIONS

This application claims the priority of Korean Patent Application No. 10-2021-0101837 filed on Aug. 3, 2021, in the Korean Intellectual Property Office, the disclosure of which is incorporated herein by reference.

BACKGROUND OF THE INVENTION

Field of the Invention

The present disclosure relates to interaction between people and computers, and more particularly, to a method and a system for interaction capable of improving feeling of use and immersion by changing a center of gravity and a length of a controller operated by a user in reality in response to a shape of a virtual object expressed by a virtual reality (VR) application.

Description of the Related Art

Recently, a lot of input devices based on motion recognition have been widely used to control an operation of a game device, a virtual reality (VR) device, and the like or control a virtual object displayed on a display of the device by recognizing a user's motion.

The input devices based on motion recognition are divided into a handheld type, a wearable type, a motion capture type, and the like, and two or more types may be applied together in some cases.

The handheld type is handheld and used by the user, and includes a motion sensor (acceleration sensor, angular velocity sensor, etc.) and an input button and generates a control signal of an electronic device using a measurement value of the sensor for a motion of the user's hand.

The wearable type is a device worn on a user's body (head, arm, wrist, etc.) and determines the motion of a user's hand or finger using a measurement value of a motion sensor, an EMG (Electromyogram) sensor, etc. and generates a control signal of an electronic device using the measurement value.

The motion capture type determines a motion of user's body (arm, leg, hand, finger, etc.) or a controller using an image captured by a camera and generates a control signal of an electronic device using the motion.

Meanwhile, FIG. 1 illustrates a use example of a general handheld type controller 20, and when a user moves the controller 20 while holding in a hand, an electronic device 10 generates a predetermined control signal from a measurement value of a motion sensor received from the controller 20 to control the operation of the electronic device 10 or control the position, direction, speed, and the like of a virtual object displayed on a display.

However, the conventional handheld controller 20 has a fixed shape, while types of virtual objects to be controlled are various, and thus, it is very difficult to develop a controller for providing feeling of use suitable for all the virtual objects.

In order to improve the disadvantage, in Korean Patent Registration No. 10-2248934, there has been provided a controller capable of detecting the motion of a controller by a motion sensor and changing a total length by moving a moving part when a predetermined condition is satisfied.

However, in the controller according to Korean Patent Registration No. 10-2248934, when the user just shakes the controller regardless of the shape of the virtual object displayed on an executing content or a display, the length or shape of the controller may be changed, and thus, the length or shape of the controller is mismatched with the virtual object to lower the immersion and feeling of use of the user.

Further, in the controller according to Korean Patent Registration No. 10-2248934, there is an advantage of improving the feeling of use and fun through the length change, but there is a limit that the controller cannot change the feeling of weight which occupies a very large portion among the senses felt by the user's hand holding the controller.

The above-described technical configuration is the background art for helping in the understanding of the present disclosure, and does not mean a conventional technology widely known in the art to which the present disclosure pertains.

SUMMARY OF THE INVENTION

The present disclosure is derived from the background, and an object of the present disclosure is to provide a method and a system for interaction capable of improving the immersion and feeling of use of a user by changing a center of gravity and a length of a controller operated by the user in reality in linkage with the shape of a virtual object expressed on a display.

An aspect of the present disclosure provides an interaction system including a controller including a first actuator configured to change a position of a mass and a first processor configured to control an operation of the first actuator; and a content execution device configured to execute an application according to a control signal received from the controller and generate a feedback signal to transmit the generated feedback signal to the controller when a virtual object change event occurs during the application execution, wherein the first processor of the controller controls the first actuator when the feedback signal is received to move the mass and move a center of gravity.

The controller may include a moving part coupled movably to a housing and a second actuator moving the moving part, and the first processor controls the second actuator to move the moving part when the feedback signal is received.

The first actuator may be provided in the moving part, and the mass may be movably coupled to the moving part. In this case, the first actuator may include a motor and a screw provided in the moving part, the mass may be coupled to the screw, and a rail configured to prevent the rotation while guiding the movement of the mass may be provided inside the moving part.

The second actuator may include a motor provided in the housing and a screw of which one end is coupled to the motor, and the screw may be screwed to a fixing nut provided in the moving part.

The second actuator may include an actuator housing fixed to the housing, a base provided inside the actuator housing and having various conductive lines, a plurality of piezoelectric bimorphs electrically connected with the plurality of conductive lines while a lower end is fixed to the base, and a moving rod provided to pass through the actuator housing while one end is coupled to the moving part and provided on the plurality of piezoelectric bimorphs, and while at least one of the plurality of piezoelectric bimorphs is bending-deformed and move the moving rod, the moving part may be moved.

The first actuator may be installed in the housing, and the mass is moved independently of the moving part.

The controller may include a guide member to guide the movement of the mass, and the first actuator may be a stopper actuator which is provided in the guide member to selectively block the movement of the mass. In this case, the guide member may be a guide pipe into which the mass is inserted or a guide rod passing through the mass.

Another aspect of the present disclosure provides an interaction method including an event detection step of detecting, by a content execution device, a virtual object change event while executing an application; a feedback step of generating, by the content execution device, a feedback signal to transmit the generated feedback signal to a controller when the virtual object change event occurs; and a center of gravity moving step of moving, by the controller, a mass provided therein in response to the feedback signal.

In the event detection step, when the shape or type of a virtual object displayed on a display is changed, the content execution device may determine that the virtual object change event is detected.

In the event detection step, when the virtual object displayed on the display is changed to a registered virtual object, the content execution device may determine that the virtual object change event is detected.

In the event detection step, when the virtual object is selected by a selection signal transmitted from the controller, the content execution device may determine that the virtual object change event is detected.

In the event detection step, the content execution device may predetermine a time point when the virtual object displayed on the display is to be changed and determines that the virtual object change event is detected before a predetermined time based on the time point to be changed, and in the feedback step, the content execution device may generate a feedback signal in advance before the virtual object on the display is changed and transmit the generated feedback signal to the controller.

The feedback signal may include a length change command, and in the center of gravity moving step, the controller moves a moving part coupled to the housing.

According to the present disclosure, since the center of gravity and the length of the controller operated by the user in reality may be changed in linkage with a change of the virtual object displayed on the display while executing the VR application, it is possible to greatly improve the immersion and feeling of use of the user.

BRIEF DESCRIPTION OF THE DRAWINGS

The above and other aspects, features and other advantages of the present invention will be more clearly understood from the following detailed description taken in conjunction with the accompanying drawings, in which:

FIG. 1 is a diagram illustrating a use example of a conventional wireless controller;

FIG. 2 is a schematic diagram of an interaction system according to an exemplary embodiment of the present disclosure;

FIG. 3 is a diagram illustrating an application example of the interaction system according to the exemplary embodiment of the present disclosure;

FIG. 4 is a diagram illustrating a controller according to a first exemplary embodiment of the present disclosure and an operation thereof;

FIG. 5 is a block diagram illustrating a control system of the controller according to the first embodiment of the present disclosure;

FIG. 6 is a diagram illustrating an actuator layout of the controller according to the first embodiment of the present disclosure;

FIG. 7 is a diagram illustrating various operations of the controller according to the first embodiment of the present disclosure;

FIG. 8 is a block diagram illustrating a control system of a content execution device;

FIG. 9 is a flowchart illustrating an interaction method according to a first embodiment of the present disclosure;

FIG. 10 is a flowchart illustrating an interaction method according to a second embodiment of the present disclosure;

FIGS. 11 and 12 are diagrams illustrating an appearance in which a length and a center of gravity of the controller are changed in response to a change in virtual object;

FIG. 13 is a diagram illustrating an actuator layout of the controller according to the second embodiment of the present disclosure;

FIG. 14 is a diagram illustrating various operations of the controller according to the second embodiment of the present disclosure;

FIG. 15 is a diagram illustrating an actuator layout of a controller according to a third embodiment of the present disclosure;

FIGS. 16 and 17 are diagrams illustrating various operations of the controller according to the third embodiment of the present disclosure;

FIG. 18 is a diagram illustrating a modification example of the controller according to the third embodiment of the present disclosure;

FIG. 19 is a diagram illustrating an actuator layout of a controller according to a fourth embodiment of the present disclosure;

FIGS. 20 and 21 are diagrams illustrating various operations of the controller according to the fourth embodiment of the present disclosure;

FIGS. 22 and 23 are diagrams illustrating a controller in which both first and second actuators are linear screw actuators;

FIGS. 24 and 25 are diagrams illustrating a controller in which the first and second actuators are a linear screw actuator and a linear piezoelectric actuator, respectively; and FIGS. 26 to 28 are diagrams illustrating an operational principle of the linear piezoelectric actuator.

DETAILED DESCRIPTION OF THE PREFERRED EMBODIMENT

Hereinafter, preferred embodiments of the present disclosure will be described with reference to the drawings.

For reference, in the accompanying drawings of this specification, there are parts indicated with actually different dimensions or ratios, but this is for convenience of description and understanding, and thus, it should be noted in advance that the scope of the present disclosure should not be limitedly interpreted. Further, in this specification, when an element is connected, coupled, or electrically connected to another element, the element is not only directly connected, coupled, or electrically connected to another element, but also indirectly connected, coupled, or electrically connected to another element with other elements interposed therebetween. Also, when an element is directly connected or coupled to another element, unless otherwise indicated, it is meant that the element is connected or coupled to another element without other elements therebetween. In addition, when a certain part includes a certain element, unless otherwise indicated, it means that other elements may be further included rather than excluding the other elements. In addition, in this specification, since expressions such as front, rear, left, right, upper, and lower are relative concepts that may vary depending on viewing positions, the scope of the present disclosure is not necessarily limited to the corresponding expressions.

As illustrated in a schematic diagram of FIG. 2 an interaction system according to an embodiment of the present disclosure includes a controller 100, and a content execution device 200 performing a predetermined operation according to a control signal transmitted from the controller 100.

Particularly, in the embodiment of the present disclosure, the content execution device 200 transmits a predetermined feedback signal to the controller 100 in response to a change in virtual object displayed on a display by the content execution, and the controller 100 changes a center of gravity by moving a mass M provided therein or changes the length or shape of the controller 100 by moving a moving part.

FIG. 3 illustrates a specific example of the interaction system according to the embodiment of the present disclosure and illustrates a system including a handheld type controller 100 and a head mounted display (HMD) type content execution device 200.

The content execution device 200 executes a content application such as VR and augmented reality (AR) and outputs the executed content through the display. In FIG. 3, the content execution device 200 is illustrated as the HMD type, but is not limited thereto, and as illustrated in FIG. 1, may consist of a display and a computer device which are provided to be spaced apart from the user.

When the content execution device 200 is an HMD type VR device, since the user can view only a virtual space through the display, but cannot view the handheld controller 100, the interaction method is mainly applied with an invisible method such as moving the center of gravity of the controller 100 or generating vibration.

Unlike this, when the content execution device 200 is an AR glass or includes a display separated from the user, since the user can view the handheld controller 100 during the content execution, visual interaction of appropriately changing the length or shape of the controller 100 as well as the invisible method such as moving the center of gravity of the controller 100 or generating the vibration may be an important factor.

FIG. 4 illustrates an appearance of a controller 100 according to a first embodiment of the present disclosure, and the controller 100 includes a housing 110 and a moving part 112 coupled movably to the housing 110. The length of the controller 100 according to the embodiment of the present disclosure may be increased or decreased as the moving part 112 moves. Further, as the mass M provided therein moves, the position of a center of gravity CG may also be changed.

Further, FIG. 5 is a block diagram illustrating a control system of the controller 100 according to the first embodiment of the present disclosure. Referring to FIG. 5, the controller 100 according to the first embodiment of the present disclosure includes a micro controller unit (MCU) 120 for controlling the overall operation of the controller 100, a first actuator 130 for changing the center of gravity by moving a mass M, a second actuator 140 for changing the length of the controller 100 by moving the moving part 112, a motion sensor for detecting a motion or a gesture of the controller 100, a vibration generation unit for providing a haptic feedback to the user, an input unit 170 for inputting a predetermined command by the user, a first communication unit 180 for communicating with the content execution device 200, a power supply unit 190 for supplying power to each component of the controller 100, and the like.

The housing 110 has a hollow portion therein, and may have a cylindrical shape of which one end is closed and the other end is opened. The shape of the housing 110 is not limited. A rail or the like that guides the movement of the moving part 112 may be provided in the housing 110.

The shape of the moving part 112 is not limited. The moving part 112 may be provided to be fully inserted into the housing 110 in an idle state and may be provided so that a part thereof protrudes from the outside of the housing 110. Further, in FIG. 4, the moving part 112 is inserted into the housing 110, but on the contrary, may also be configured so that a part of the housing 110 is inserted into the moving part 112.

The MCU 120 may generate a predetermined control signal using an input through the input unit 170 or a measurement value of the motion sensor 150 and transmit the generated control signal to the content execution device 200 through the first communication unit 180.

Further, when the MCU 120 receives a feedback signal from the content execution device 200, the MCU 120 may control the first actuator 130 to move the mass M and then change the center of gravity CG of the controller 100 or control the second actuator 140 to move the moving part 112 and then change the length or shape of the controller 100.

The MCU 120 may include a processor 122 and a memory 124. The processor 122 executes a computer program stored in the memory 124 to perform a predetermined operation. The processor 122 and the memory 124 may be packaged as a single chip.

The memory 124 may store computer programs, various parameters, data, etc. for the operation of the controller 100. The memory 124 may include a nonvolatile memory such as a flash memory and a volatile memory such as a RAM. The memory 124 may also include a mass storage device such as an HDD, an SSD, and the like.

The computer program stored in the memory 124 may include a control signal generating program for generating a control signal to be transmitted to the content execution device 200 using the measurement value of the motion sensor 150 or the command input through the input unit 170.

The first actuator 130 serves to move the mass M provided in the housing 110 or the moving part 112 and the second actuator 140 serves to move the moving part 112.

The types of the first actuator 130 and the second actuator 140 are not particularly limited, and may be appropriately selected in consideration of the size, weight, etc. of the controller 100.

As an example, a general linear actuator such as a ball screw actuator, a lead screw actuator, a pneumatic cylinder, and a hydraulic cylinder may be used. As another example, a linear actuator may be used based on a smart material such as an electroactive polymer (EAP), a shape memory alloy (SMA), and a piezoelectric element.

In addition, the first actuator 130 and the second actuator 140 may be the same type or different types.

In the controller 100 according to the first embodiment of the present disclosure, as illustrated in the layout diagram of FIG. 6, the first actuator 130 and the mass M may be provided in the moving part 112 and the second actuator 140 may be provided in a space between an inner wall of the housing 110 and the moving part 112. At this time, the first actuator 130 may be fixed to the moving part 112, and the second actuator 140 may be fixed to the housing 110.

In such a layout, the first actuator 130 and the second actuator 140 are selectively driven to perform various operations as illustrated in FIG. 7.

First, as illustrated in (a) of FIG. 7, only the first actuator 130 is driven to move the mass M located around an end of the moving part 112 to the vicinity of the other end of the moving part 112, thereby changing the center of gravity of the controller 100.

In addition, as illustrated in (b) of FIG. 7, only the second actuator 140 is driven to push the moving part 112 to the outside of the housing 110, thereby greatly changing the length of the controller 110. In this case, since the mass M and the first actuator 130 provided inside the moving part 112 also move together with the moving part 112, the center of gravity of the controller 100 is changed.

In addition, as illustrated in (c) of FIG. 7, both the first actuator 130 and the second actuator 140 are driven to push the moving part 112 to the outside of the housing 110, while may move the mass M provided in the moving part 112 to the vicinity of the other end of the moving part 112. In this case, since the length of the controller 100 is changed and the mass M is moved to the maximum distance from the initial position, the position of the center of gravity is also very greatly changed.

The motion sensor 150 is to detect a moving direction, a speed, a posture, etc. of the controller 100, and may include at least one of, for example, an acceleration sensor and a 3-axis angular velocity sensor (gyro sensor).

The vibration generation unit 160 serves to provide a haptic feedback by generating a predetermined vibration in response to the input through the input unit 170, the motion of the controller 100, the feedback signal received from the content execution device 200, and the like. The type, the number, and the vibration method, etc. of the vibration generation unit 160 are not limited.

The input unit 170 may be provided on the housing 110 so that the user can press or touch with a thumb. In the drawing, the input unit 170 is illustrated as a single button, but this is only an example. For example, the input unit 170 may include a plurality of buttons, and may also include a joystick, may also include a rotary dial, may also include a haptic dial or a haptic wheel, or may also include a touchpad or a touch screen The first communication unit 180 supports wired and/or wireless communication of the controller 100 and the content execution device 200. The wireless communication method is not particularly limited, and may be appropriately selected from known communication methods, such as Bluetooth, Zigbee, Wi-Fi, infrared data communication (IrDA), and ultra-wide band (UWB) or short-range wireless communication methods to be developed in the future.

The power supply unit 190 may include a switching circuit and a battery that control the power supply to the first and second actuators 130 and 140 according to the control of the MCU 120. The power supply unit 190 may include an AC-DC conversion circuit instead of the battery.

Although not illustrated in the drawing, a pressure sensor capable of sensing a holding force may also be provided in a portion of the housing 110 held by the user's hand.

On the other hand, the MCU 120, the motion sensor 150, the vibration generation unit 160, the first communication unit 180, the power supply unit 190, and the like may be provided in space between the inner wall of the housing 110 and the moving part 112. Unlike this, at least one thereof may also be provided inside the moving part 112.

FIG. 8 is a schematic diagram illustrating a control system of the content execution device 200. As illustrated in FIG. 8, the content execution device 200 may include a processor 210, a memory 220, a display 230, a second communication unit 240, a power supply unit 250, and the like.

The processor 210 executes a computer program stored in the memory 220 to perform a predetermined operation.

The memory 220 may store computer programs, various parameters, data, etc. for the operation of the content execution device 200. The memory 220 may include a nonvolatile memory such as a flash memory and a volatile memory such as a RAM. The memory 220 may also include a mass storage device such as an HDD, an SSD, and the like.

The computer program stored in the memory 220 may include an application 260 that executes a VR content, an AR content, and the like stored in a storage or received from an external server.

The application 260 according to the embodiment of the present disclosure may include an object control unit 262, a feedback determination unit 264, a feedback signal generation unit 266, and the like, which are functionally divided.

The object control unit 262 controls the operation of the display 230 that displays a content image based on the control signal received from the controller 100, or controls the generation, destruction, position, posture, speed, acceleration, direction, and the like of a virtual object displayed on the display 230.

The feedback determination unit 264 monitors whether a change event of changing a shape or type of the virtual object displayed on the display 230 occurs while executing the VR content, the AR content, and the like and determines whether to satisfy a feedback condition set when the virtual object change event occurs.

In this specification, even in the case where one virtual object is selected from a plurality of virtual objects in addition to a case where the shape or type of the virtual object displayed on a screen is changed, it is defined that the virtual object change event occurs.

As an example, the feedback determination unit 264 may determine that the virtual object change event occurs immediately when the shape or type of the virtual object displayed on the display 230 and controlled by the controller 100 is changed.

However, in this case, the feedback determination unit 264 may further determine whether to satisfy the feedback condition even if the virtual object change event occurs. For example, even if the virtual object is changed from a stick to a hammer, it is possible to determine that the feedback condition is satisfied only when the hammer has at least a certain size.

As another example, the feedback determination unit 264 may determine that the virtual object change event occurs only when the virtual object displayed on the display 230 is changed to a pre-registered virtual object. In this case, it is possible to determine that the feedback condition is satisfied when the virtual object change event occurs.

For example, if a stick, a hammer, a short stick, a long stick, a big hammer, a small hammer, or the like is the pre-registered virtual object for feedback, when the virtual object that has been displayed on the display 230 during the content execution is changed or selected to any one of the registered virtual objects, the feedback determination unit 264 may determine that the virtual object change event occurs and the feedback condition is satisfied.

As yet another example, the feedback determination unit 264 may determine that the virtual object change event occurs when one virtual object is selected from the plurality of virtual objects displayed on the display 230 by a selection signal transmitted from the controller 100 or other methods.

In this case, the feedback determination unit 264 may determine that the feedback condition is also automatically satisfied when the virtual object change event occurs, and may determine that the feedback condition is satisfied when the pre-registered virtual object is selected.

As yet another example, the feedback determination unit 264 may predetermine a time point when the shape or type of the virtual object displayed on the current display 230 is to be changed and determine that the virtual object change event occurs before a predetermined time (e.g., 1 sec) based on the time point to be changed.

As such, the feedback signal is transmitted to the controller 100 immediately before the virtual object displayed on the display 230 is changed to match a time point when the center of gravity and/or the length of the controller 100 is changed with a time point when the virtual object is changed in the display 230, thereby allowing the user to feel more vivid feeling of use and immersion.

In this case, the feedback determination unit 264 may determine that the feedback condition is also automatically satisfied when the virtual object change event occurs, and may determine that the feedback condition is satisfied only when the virtual object is to be changed to a pre-registered virtual object.

The feedback signal generation unit 266 serves to appropriately generate an appropriate feedback signal to transmit the generated feedback signal to the controller 100 when the feedback determination unit 264 determines that the virtual object change event occurs and the feedback condition is satisfied.

As an example, when a virtual object is changed from a stick to a hammer or changed from a hammer to a stick, the feedback signal generation unit 266 may generate and transmit a feedback signal including a mass M movement command for changing the center of gravity. In this case, a movement distance of the mass M may be included in the feedback signal. In addition, for example, the movement distance of the mass M may be differentiated according to the size of the hammer and included in the feedback signal.

As another example, when the virtual object is changed, for example, from a short stick to a long stick, the feedback signal generation unit 266 may generate and transmit a feedback signal including a moving part movement command for changing the length. In this case, a movement distance of the moving part 112 may be included in the feedback signal. In addition, for example, the movement distance of the moving part 112 may be differentiated according to the length of the stick and included in the feedback signal.

Meanwhile, the object control unit 262, the feedback determination unit 264, and the feedback signal generation unit 266 needs not to be implemented in software, but at least one or some functions thereof may also be implemented in hardware and may also be implemented in a combination of software and hardware. At this time, the hardware may also be an application specific integrated circuit (ASIC).

Referring back to FIG. 8, the display 230 is a device for visually displaying a content image and the type or size is not particularly limited.

The second communication unit 240 supports wired and/or wireless communication with the first communication unit 180 provided in the controller 100. The wireless communication method is not particularly limited, and may be selected from known communication methods, such as Bluetooth, Zigbee, Wi-Fi, infrared data communication (IrDA), and ultra-wide band (UWB).

The second communication unit 240 may support data communication with external servers or other electronic devices.

The power supply unit 250 provides driving power required for each component of the content execution device 200.

Hereinafter, an interaction method according to a first embodiment of the present disclosure will be described with reference to FIG. 9. The interaction method according to the first embodiment of the present disclosure relates to an interaction method of moving a center of gravity of the controller 100 in response to an application executed in the content execution device 200.

First, the MCU 120 of the controller 100 may generate a predetermined control signal based on an input through the input unit 170 or a measurement value of the motion sensor 150 and transmit the generated control signal to the content execution device 200 through the first communication unit 180. (ST11)

The content execution device 200 executes a corresponding application according to the received control signal and displays an image including a virtual object on the display 230. In addition, the object control unit 262 also controls the generation, destruction, position, posture, speed, acceleration, direction, and the like of the virtual object in response to the received control signal. (ST12)

As such, when the application is executed, the feedback determination unit 264 of the content execution device 200 monitors whether a virtual object change event occurs during the content execution and determines whether a feedback condition is satisfied. (ST13)

If it is determined that the virtual object change event occurs and the feedback condition is satisfied, the feedback signal generation unit 266 of the content execution device 200 generates a feedback signal including a center of gravity movement command and transmits the generated feedback signal to the controller 100. (ST14 and ST15)

The MCU 120 of the controller 100 receiving the center of gravity movement command moves the mass M by a predetermined distance. If information on the moving distance of the mass M is included in the received feedback signal, the MCU 120 may move the mass M by the corresponding distance.

The controller 100 receiving the center of gravity movement command may drive only the first actuator 130 to move the mass M as illustrated in (a) of FIG. 7, drive only the second actuator 140 to move the moving part 112 and indirectly move the mass M as illustrated in (b) of FIG. 7, and drive both the first actuator 130 and the second actuator 140 to move both the moving part 112 and the mass M as illustrated in (c) of FIG. 7, thereby maximizing the moving distance of the mass M. (ST16)

Through the above processes, even after the center of gravity of the controller 100 moves, the feedback determination unit 264 of the content execution device 200 may continuously perform step ST13 of monitoring whether the virtual object change event occurs and determining whether the feedback condition is satisfied.

Next, an interaction method according to a second embodiment of the present disclosure will be described with reference to FIG. 10. The interaction method according to the second embodiment of the present disclosure relates to an interaction method of changing a length of the controller 100 in response to an application executed in the content execution device 200.

First, since ST21 to ST23 are the same as ST11 to ST13 of FIG. 9, the description will be omitted.

In ST23, if it is determined that the virtual object change event occurs and the feedback condition is satisfied, the feedback signal generation unit 266 of the content execution device 200 generates a feedback signal including a length change command and transmits the generated feedback signal to the controller 100. (ST24, ST25)

The MCU 120 of the controller 100 receiving the length change command controls the second actuator 140 to move the moving part 112 by a predetermined distance. If information on the moving distance of the moving part 112 is included in the received feedback signal, the MCU 120 may move the moving part 112 by the corresponding distance. (ST26)

Through the above processes, even after the length of the controller 100 is changed, the feedback determination unit 264 of the content execution device 200 may continuously perform step ST23 of monitoring whether the virtual object change event occurs and determining whether the feedback condition is satisfied.

In FIGS. 9 and 10, it has been described that if the virtual object change event occurs and the feedback condition is satisfied, the feedback determination unit 264 of the content execution device 200 transmits only one of the center of gravity movement command or the length change command, but is not limited thereto, the feedback determination unit 264 may also transmit both the center of gravity movement command or the length change command.

As an example, as illustrated in FIG. 11, when a hammer is selected from the plurality of virtual objects 234 displayed on the display 230 of the content execution device 200, the content execution device 200 may transmit the center of gravity movement command or the length change command to the controller 100.

In this case, the controller 100 moves both the mass M and the moving part 112 to locate a center of gravity CG at an upper end of the controller 100, so that the user holding the controller 100 feels a weight similar to the hammer.

As another example, when the virtual object 234 displayed on the display 230 is changed from the hammer to a stick as illustrated in FIG. 12 while using the controller 100 of which the center of gravity CG is located near the upper end, the content execution device 200 may transmit the center of gravity movement command or the length change command to the controller 100.

In this case, the controller 100 moves both the mass M and the moving part 112 to locate the center of gravity CG at a lower end of the controller 100, so that the user holding the controller 100 feels a weight similar to the stick.

Hereinafter, another embodiment of the controller used in the interaction system according to the embodiment of the present disclosure will be described.

As illustrated in a layout diagram of FIG. 13, a controller 100*a* according to a second embodiment of the present disclosure includes a first actuator 130 moving a mass M and a second actuator 140 moving a moving part 112, but has a difference from the first embodiment in that both the first actuator 130 and the second actuator 140 are fixed to a housing 110.

The controller 100*a* according to the second embodiment of the present disclosure selectively drives the first and second actuators 130 and 140 to perform various operations as illustrated in FIG. 14.

First, as illustrated in (a) of FIG. 14, only the first actuator 130 is driven to move the mass M located around a handle to the upper end of the housing 110, thereby changing a center of gravity of the controller 100*a*.

In addition, as illustrated in (b) of FIG. 14, only the second actuator 140 is driven to push the moving part 112 to the outside of the housing 110, thereby greatly changing the length of the controller 100*a*. In this case, since the mass M does not move, the center of gravity of the controller 100*a* is not almost changed.

In addition, as illustrated in (c) of FIG. 14, both the first actuator 130 and the second actuator 140 are driven to push the moving part 112 to the outside of the housing 110, while move the mass M located around a handle to the upper end of the controller 100*a*. As a result, of course, the length of the controller 100*a* is changed, and the center of gravity of the controller 100*a* is changed due to the movement of the mass M.

As illustrated in a layout diagram of FIG. 15, a controller 100*b* according to a third embodiment of the present disclosure includes a housing 110, a moving part 112 provided movably to the housing 110, a guide pipe 136 provided inside the moving part 112, a mass M provided inside the guide pipe 136, and an actuator 140 provided in a space between the moving part 112 and an inner wall of the housing 110.

That is, the controller 100*b* according to the third embodiment of the present disclosure has a difference from the first embodiment in that the first actuator 130 moving the mass M is omitted and the guide pipe 136 moving the mass M with gravity is provided inside the moving part 112.

The guide pipe 136 may be a pipe with both closed ends and serve as a passage of the mass M through an inner space. A first fixing device 137 and a second fixing device 138 for fixing the position of the mass M may be provided at one end and the other end of the guide pipe 136.

Each of the first fixing device 137 and the second fixing device 138 may include a stopper 139 and an actuator such as a motor and cylinder so that the stopper 139 is introduced or retreated into or from the guide pipe 136.

The controller 100*b* according to the third embodiment of the present disclosure selectively drives the first fixing device 137, the second fixing device 138, and the actuator 140 to perform various operations as illustrated in FIGS. 16 and 17.

As an example, as illustrated in (a) of FIG. 16, when the stoppers 139 of the first fixing device 137 and the second fixing device 138 are retreated while the controller 100*b* is tilted, the mass M moves downward by gravity inside the guide pipe 136.

In this state, as illustrated in (b) of FIG. 16, when the stopper 139 of the first fixing device 137 is introduced into the guide pipe 136, the position of the mass M is fixed even if the controller 100*b* is erected, thereby changing the center of gravity of the controller 100*b*.

As another example, as illustrated in (a) of FIG. 17, when the actuator 140 is driven to push the moving part 112 to the outside of the housing 110 while the controller 100*b* is tilted, while both the stoppers 139 of the first fixing device 137 and the second fixing device 138 are retreated, the mass M moves downward by gravity inside the guide pipe 136.

In this state, as illustrated in (b) of FIG. 17, when the stopper 139 of the first fixing device 137 is introduced into the guide pipe 136, the position of the mass M is fixed and maximally moved even if the controller 100*b* is erected, thereby greatly changing the center of gravity of the controller 100*b*. In addition, since the moving part 112 moves, the length of the controller 100*b* is changed.

On the other hand, the guide pipe 136 of the controller 100*b* according to the third embodiment of the present disclosure may also be replaced with a guide rod 136*a*, as illustrated in FIG. 18. That is, the guide rod 136*a* for guiding the movement by penetrating the mass M may also be provided instead of the guide pipe 136. In this case, the stoppers 139 of the first and second fixing devices 137 and 138 are provided to be approached or retreated toward the guide rod 136*a*.

As illustrated in a layout diagram of FIG. 19, a controller 100*c* according to a fourth embodiment of the present disclosure includes a housing 110, a moving part 112 provided movably to the housing 110, a guide pipe 136 provided inside the housing 110, a mass M provided inside the guide pipe 136, and an actuator 140 provided in a space between the moving part 112 and an inner wall of the housing 110.

That is, the controller 100*c* according to the fourth embodiment of the present disclosure has a difference from the first to third embodiments in that the guide pipe 136 moving the mass M is provided inside the housing 110 and the first actuator 130 is omitted.

Since the shape of the guide pipe 136 and the first fixing device 137 and the second fixing device 138 provided at one end and the other end of the guide pipe 136 are the same as those of the third embodiment, the description thereof will be omitted.

The controller 100*c* according to the fourth embodiment of the present disclosure selectively drives the first fixing device 137, the second fixing device 138, and the actuator 140 to perform various operations as illustrated in FIGS. 20 and 21.

As an example, as illustrated in (a) of FIG. 20, when the stoppers 139 of the first fixing device 137 and the second fixing device 138 are retreated while the controller 100*c* is tilted, the mass M moves downward by gravity inside the guide pipe 136.

In this state, as illustrated in (b) of FIG. 20, when the stopper 139 of the first fixing device 137 is introduced into the guide pipe 136, the position of the mass M is fixed even if the controller 100*c* is erected, thereby changing the center of gravity of the controller 100*c*.

As another example, as illustrated in (a) of FIG. 21, when the actuator 140 is driven to push the moving part 112 to the outside of the housing 110 while the controller 100*c* is tilted, while both the stoppers 139 of the first fixing device 137 and the second fixing device 138 are retreated, the mass M moves downward by gravity inside the guide pipe 136.

In this state, as illustrated in (b) of FIG. 21, when the stopper 139 of the first fixing device 137 is introduced into the guide pipe 136, the position of the mass M is fixed even if the controller 100*c* is erected, thereby greatly changing the center of gravity of the controller 100*c*. In addition, since the moving part 112 moves, the length of the controller 100*c* is changed.

The guide pipe 136 of the controller 100*c* according to the fourth embodiment of the present disclosure may also be replaced with the guide rod 136*a* of FIG. 18.

On the other hand, in the controllers 100*b* and 100*c* according to the third and fourth embodiments of the present disclosure, the operations of the first and second fixing devices 137 and 138 may be controlled by the MCU 120. For this purpose, a mass sensor (not illustrated) capable of detecting the mass M may be provided around the guide pipe 136 or the guide rod 136*a*.

For example, when it is confirmed that the mass M reaches a predetermined position through the mass sensor after receiving a center of gravity movement command, the MCU 120 of the controllers 100*b* and 100*c* controls the fixing devices 137 and 138 of the corresponding position to move the stopper 139 and fix the position of the mass M.

The mass sensor may be a contact type sensor or a non-contact type sensor.

Hereinafter, specific embodiments of the first and second actuators 130 and 140 provided in the controllers 100, 100*a*, 100*b*, and 100*c* according to the embodiments of the present disclosure will be described.

A controller 100*d* illustrated in FIG. 22 illustrates a case where the first and second actuators 130 and 140 are linear screw actuators.

The first actuator 130 is a motor fixed to the moving part 112, a screw 131 is provided inside the moving part 112 along a moving direction of the moving part 112, and an end of the screw 131 is coupled to a motor rotary shaft. In addition, the mass M is screwed to the screw 131, and a rail 114 for preventing the rotation while guiding the movement of the mass M is provided inside the moving part 112.

Accordingly, when the first actuator 130 rotates the screw 131, the mass M moves along the screw 131 and the rail 114, thereby changing the center of gravity of the controller 100*d*.

The second actuator 140 is a motor fixed to the housing 110, a screw 141 is provided on the motor rotary shaft, and the screw 141 is coupled to a fixing nut 142 provided in the moving part 112.

Accordingly, when the second actuator 140 rotates the screw 141, the moving part 112 moves along the screw 141 due to the fixing nut 142 screwed to the screw 141.

FIG. 23 illustrates a state in which as both the first and second actuators 130 and 140 operate, the mass M and the moving part 112 move along the screws 131 and 141, respectively.

Unlike this, of course, only one of the first and second actuators 130 and 140 may be driven to move only one of the mass M and the moving part 112.

In FIGS. 22 and 23, it has been illustrated that the first actuator 130 is fixed to the moving part 112, but unlike this, of course, the first actuator 130 may be fixed to the housing 110.

In a controller 100*e* illustrated in FIG. 24, the first actuator 130 is a linear screw actuator as described above, and the second actuator is a linear piezoelectric actuator 140*a*.

As illustrated in a schematic diagram of FIG. 26, the linear piezoelectric actuator 140*a* includes an actuator housing 145, a base 146 provided inside the actuator housing 145 and having various conductive lines for electrical connection, a plurality of piezoelectric bimorphs 147 electrically connected with the conductive lines while a lower end is fixed to the base 146, and a moving rod 144 provided on the plurality of piezoelectric bimorphs 147 and provided to pass through the actuator housing 145.

The piezoelectric bimorph 147 includes a first piezoelectric element 147*a* and a second piezoelectric element 147*b* disposed in the same direction as each other and a contact part 147*c* coupled to the upper ends of the first piezoelectric element 147*a* and the second piezoelectric element 147*b*. The contact part 147*c* of the piezoelectric bimorph 147 may be in contact with the moving rod 144 above while bending operation.

The first piezoelectric element 147*a* and the second piezoelectric element 147*b* may be in contact with each other and minutely spaced apart from each other.

The entire shape of the plurality of piezoelectric bimorph 147 may be variously changed by selectively applying an electric field to the first piezoelectric element 147a or the second piezoelectric element 147b.

For example, when the first piezoelectric element 147a is expanded, bending deformation occurs toward the second piezoelectric element 147b, and when the second piezoelectric element 147b is expanded, bending deformation occurs toward the first piezoelectric element 147a.

The linear piezoelectric actuator 140a moves the moving rod 144 provided on the piezoelectric bimorph 147 using this principle.

That is, as illustrated in FIGS. 27 and 28, while a process of selecting some of the plurality of piezoelectric bimorphs 147 and bending to the left is repeated, the moving rod 144 may move to the left. On the contrary, a process of selecting some of the plurality of piezoelectric bimorphs 147 and bending to the right is repeated, the moving rod 144 may move to the right.

Referring back to FIG. 24, the actuator housing 145 of the linear piezoelectric actuator 140a is fixed to the housing 110 of the controller 100e and one end of the moving rod 144 may be fixed to the moving part 112.

Therefore, when the linear piezoelectric actuator 140a is driven, as illustrated in FIG. 25, the moving rod 144 linearly moves, so that the moving part 112 is pushed and moved by the moving rod 144.

In FIGS. 24 and 25, it has been illustrated that the second actuator is the linear piezoelectric actuator 140a, but is not limited thereto, and thus, the first actuator 130 may also be replaced with the linear piezoelectric actuator.

Meanwhile, in the controllers 100, 100a, 100b, 100c, 100d, and 100e according to the embodiments of the present disclosure, a method for controlling the operations of the actuators 130, 140, and 140a, the fixing devices 137 and 138, etc. may be implemented in a program command form which may be performed by various computer means to be recorded in a computer readable recording medium.

However, the operation control of the actuators 130, 140, and 140a, the fixing devices 137 and 138, etc. is not necessarily implemented in software, and all or some functions may be implemented in hardware, or in a combination of software and hardware.

Hereinabove, the preferred embodiments of the present disclosure have been described, but the present disclosure is limited to the aforementioned embodiments and can be modified or changed in various forms in a specific application process.

For example, the first actuator 130 moving the mass M of the controller and the second actuator 140 moving the moving part 120 are not limited to the example described above. For example, the mass M or the moving part 120 may be moved by an actuator based on deformation of a smart material, such as an electroactive polymer (EAP), a magnetic fluid elastomer (MRE), a shape memory alloy (SMA), and the like.

As described above, the present disclosure may be modified or changed in various forms in the specific applying process, and modified or changed embodiments include the scope of the present disclosure without departing from the technical spirit of the present disclosure disclosed in the appended claims.

What is claimed is:

1. An interaction system comprising:
a controller including a first actuator configured to change a position of a mass and a processor configured to control an operation of the first actuator; and
a content execution device configured to execute an application according to a control signal received from the controller and generate a feedback signal to transmit the generated feedback signal to the controller when a virtual object change event occurs during the application execution,
wherein the processor of the controller controls the first actuator when the feedback signal is received to move the mass and move a center of gravity,
wherein the controller includes a moving part coupled movably to a housing and a second actuator moving the moving part, and the processor controls the second actuator to move the moving part when the feedback signal is received,
wherein the first actuator is provided in the moving part, and the mass is movably coupled to the moving part, and
wherein the first actuator includes a motor and a screw provided in the moving part,
the mass is coupled to the screw, and
a rail configured to prevent the rotation while guiding the movement of the mass is provided inside the moving part.

2. An interaction system comprising:
a controller including a first actuator configured to change a position of a mass and a processor configured to control an operation of the first actuator; and
a content execution device configured to execute an application according to a control signal received from the controller and generate a feedback signal to transmit the generated feedback signal to the controller when a virtual object change event occurs during the application execution,
wherein the processor of the controller controls the first actuator when the feedback signal is received to move the mass and move a center of gravity,
wherein the controller includes a moving part coupled movably to a housing and a second actuator moving the moving part, and the processor controls the second actuator to move the moving part when the feedback signal is received, and
wherein the second actuator includes a motor provided in the housing and a screw of which one end is coupled to the motor, and
the screw is screwed to a fixing nut provided in the moving part.

3. An interaction system comprising:
a controller including a first actuator configured to change a position of a mass and a processor configured to control an operation of the first actuator; and
a content execution device configured to execute an application according to a control signal received from the controller and generate a feedback signal to transmit the generated feedback signal to the controller when a virtual object change event occurs during the application execution,
wherein the processor of the controller controls the first actuator when the feedback signal is received to move the mass and move a center of gravity,
wherein the controller includes a moving part coupled movably to a housing and a second actuator moving the moving part, and the processor controls the second actuator to move the moving part when the feedback signal is received, and
wherein the second actuator includes an actuator housing fixed to the housing, a base provided inside the actuator housing and having various conductive lines, a plurality of piezoelectric bimorphs electrically connected with the plurality of conductive lines while a lower end is fixed to the base, and a moving rod provided to pass through the actuator housing while one end is coupled to the moving part and provided on the plurality of piezoelectric bimorphs, and while at least one of the plurality of piezoelectric bimorphs is bending-deformed and moves the moving rod, the moving part is moved.

4. An interaction system comprising:

a controller including a first actuator configured to change a position of a mass and a processor configured to control an operation of the first actuator; and a content execution device configured to execute an application according to a control signal received from the controller and generate a feedback signal to transmit the generated feedback signal to the controller when a virtual object change event occurs during the application execution, wherein the processor of the controller controls the first actuator when the feedback signal is received to move the mass and move a center of gravity, and wherein the controller includes a guide member to guide the movement of the mass, and the first actuator is a stopper actuator which is provided in the guide member to selectively block the movement of the mass.

5. The interaction system of claim 4, wherein the guide member is a guide pipe into which the mass is inserted or a guide rod passing through the mass.

* * * * *